United States Patent [19]

Avar et al.

[11] Patent Number: 5,569,539
[45] Date of Patent: Oct. 29, 1996

[54] POWDER COATING COMPOSITIONS

[75] Inventors: Lajos Avar, Biel-Benken, Switzerland; Karl Bechtold, Schliengen, Germany; Rainer Wolf, Allschwil, Switzerland

[73] Assignee: Sandoz Ltd., Basel, Switzerland

[21] Appl. No.: 371,728

[22] Filed: Jan. 12, 1995

[30] Foreign Application Priority Data

Jan. 14, 1994 [GB] United Kingdom ............ 9400681

[51] Int. Cl.⁶ ............................................ C08K 5/3475
[52] U.S. Cl. ................................ 428/457; 524/91
[58] Field of Search ........................... 428/457; 524/91

[56] References Cited

U.S. PATENT DOCUMENTS

| | | | |
|---|---|---|---|
| 4,619,956 | 10/1986 | Susi | 524/91 |
| 4,760,148 | 7/1988 | Seltzer et al. | 524/91 |
| 4,904,712 | 2/1990 | Seltzer et al. | 524/91 |
| 5,116,892 | 5/1992 | Barbee | 524/99 |
| 5,212,245 | 5/1993 | Franks et al. | 524/904 |

FOREIGN PATENT DOCUMENTS

WO94/09915  5/1994  WIPO.

OTHER PUBLICATIONS

Derwent Abstracts of: WO 94/09915 US 5212245 US 5116892 Search Report—Great Britain—dated 24 Mar. 1995 for GB 9500495.8.

*Primary Examiner*—Kriellion S. Morgan
*Attorney, Agent, or Firm*—Robert S. Honor; Carl W. Battle; Gabriel Lopez

[57] ABSTRACT

New powder coatings or powder coating compositions comprising

A) a binder system

B) specific powder coating additives

C) at least one compound of formula I

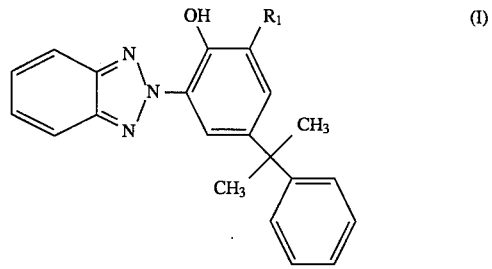

in which $R_1$ is methyl, ethyl, n-propyl, iso-propyl, n-butyl, sec-butyl or tert-butyl and optionally D) additional compounds selected from the group consisting of antioxidants, UV-stabilizers, UV-absorbers, acid scavengers, radical scavengers, pigments, dyes, UV-quenchers, processing stabilizers, fillers, and tribocharging additives exibit advantages during their production. Compounds according to formula I can be used as UV-absorbers and can be incorporated even in greater amounts and dispersed homogeneously at the manufacture of the powder coating compositions in an extruder. It is a further advantage of these compounds that they do not volatilize during stoving of the coatings.

21 Claims, No Drawings

POWDER COATING COMPOSITIONS

The invention relates to powder coating compositions comprising benzotriazole compounds as light stabilizers. More particularly the invention relates to a new powder coating composition for powder coatings, especially for clear powder coatings, as well as to a process for stabilising powder coatings. The invention relates further to the use of special benzotriazole compounds according to formula I as UV-absorbers in powder coatings or clear powder coatings.

The use of 2-(2'-hydroxy-3',5'-bis(α,α-dimethyl-benzophenyl))-benzotriazole (TINUVIN®900) as a UV-absorber is described in WO 94/09915 and U.S. Pat. No. 5 212 245. JP 53-20546 discloses a cationic electrodeposition coating composition containing 2-(2'-hydroxy-3',5'-di-tert.-butyl phenyl)benzotriazole as a UV-absorber. These coatings certainly exhibit good light stability properties but problems occur during their production.

It is the object of the invention to solve the above-mentioned problem and to provide a powder coating composition for powder coatings, preferably clear coatings. In accordance with the present invention said problem is solved by the use of new benzotriazole compounds as UV-absorbers in such powder coating compositions.

It has now been found, more particularly, that compounds of formula I

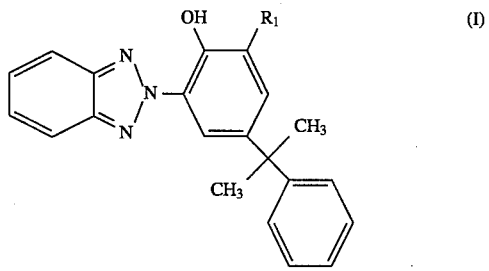

in which $R_1$ is methyl, ethyl, n-propyl, iso-propyl, n-butyl, sec-butyl or tert-butyl, preferably tert-butyl
are suitable as UV-absorbers in powder coatings or in powder coating compositions. Powder coatings usually exhibit yellowness after storing of the applied clear powder coating composition and before exposure to light or weathering. Compositions according to the present invention exhibit this initial discoloration to a considerably reduced extent.

Due to their low melting points, compounds of formula I can be incorporated into powder coating compositions without any problems and dispersed homogeneously during the production of the powder coating compositions in an extruder at the necessary low processing temperatures. In contrast to TINUVIN 900®, a compound according to the prior art, which can be incorporated only up to a defined maximum concentration, the compounds of formula I can be incorporated in greater amounts because their solubility is 5 to 10 times greater than that of TINUVIN 900®. Further, the compounds of formula I need not be micronised before their use, so that this further processing step is not necessary. This is a particular advantage of the present invention.

It is a further advantage of the compounds according to formula I that they do not volatilize during stoving due to their low vapor pressure.

Compounds of formula I prevent the discoloration or yellowing of powder coating compositions during their production as well as the discoloration or yellowing of the stoved powder coatings by photodegradation (e.g. due to weathering).

According to the invention, compounds of formula I can be used in any powder coating known in the art. They are particularly useful in polyolefinic, polyamide or polyester based thermoplastic powder coatings as well as in thermosetting powder coatings, such as epoxy powder coatings, polyurethane powder coatings, polyester powder coatings, acrylic powder coatings, unsaturated polyester powder coatings, and so-called hybrid powder coatings in which a carboxyl functional polyester resin is cured with bisphenol A epoxy resin.

Preferred powder coatings are acrylic powder coatings.

Compounds of formula I are known or can be produced according to well known processes, e.g. preparing first an azo-dye by reaction of the corresponding substituted phenol with nitrobenzene diazonium chloride followed by cyclization by reaction with hydrazin hydrate.

Powder coating compositions according to the invention comprise a binder system as component (A), specific powder coating additives as component (B), at least one compound of formula I as component (C) and optionally various additional compounds as component (D).

Any binder system known in the art can be used as component (A). In the case of thermoplastic powder coatings the binder system comprises only the binder resin, for example a polyolefin, a polyamide or a thermoplastic polyester. In the case of thermosetting powder coatings, the binder system comprises a binder resin and a crosslinker, curing agent or hardener well-suited to the binder resin. For example, triglycidyl isocyanurate (TGIC) is one of the most important curing agents for carboxyl-terminated polyester binder resins. For instance, dicyandiamides and their derivatives are the most widely used crosslinking agents for epoxy powder coatings. In polyurethane based powder coatings, blocked polyisocyanates, such as blocked toluene diisocyanate, are often employed as crosslinking agents.

Component (B) comprises specific powder coating additives, such as levelling and degassing agents. These are well-known.

Preferably the amount of component (C) that can be added is from 0,01 to 5 % by weight, more preferably 0,02 to 2 % by weight based on component (A).

The additional compounds, i.e. component (D), are selected from the group consisting of antioxidants, UV-stabilizers, UV-absorbers, acid scavengers, radical scavengers, pigments, dyes, UV-quenchers, processing stabilizers, fillers, and tribocharging additives.

Sterically hindered phenols, secondary aromatic amines or thioethers (as described in "Kunststoff-Additive"-G ächter/Müller, Ed.3,1990, p. 42 to 50, the contents of which are incorporated herein by reference) can be used as antioxidants. Examples for acid scavengers are sodium, magnesium or calcium stearates or lactates, hydrotalcite or alkoxylated amines. Useful UV-stabilizers are other sterically hindered amines, for example, N-unsubstituted, N-alkyl-or N-acylsubstituted 2,2,6,6-tetra-methylpiperidine compounds - also known as hindered amine light stabilizers (HALS). 2-(2'-hydroxyphenyl)-benzotriazoles, 2-hydroxybenzophenones, 1,3-bis-(2'-hydroxybenzoyl)benzene salicylates, cinnamates, and oxalic acid diamides can be used as UV-absorber. Suitable UV-quenchers are for instance benzoates and substituted benzoates. A tribocharging additive is for example TINUVIN 144®. Useful radical scavengers are those commonly available in commerce, such as TINUVIN 622®, SANDUVOR 3058®, TINUVIN 144®, and others.

Powder coatings according to the invention can also include processing stabilizers, such as phosphites and phosphonites, for example SANDOSTAB®P-EPQ, in an amount preferably of 0,01 to 8% by weight, more preferably 0,02 to 5% by weight based on the binder system, component (A).

The following examples illustrate the invention.

EXAMPLES

1. Production of a Powder Coating Composition

2% by weight, based on the resin component, of compound Ia below, is added to a commercially-available blend comprising a hydroxy group-containing acrylate resin, polyisocyanate, 0.7 to 1% by weight of benzoine (degassing agent), and 3% by weight of Modaflow III®(levelling agent). All compounds are mixed in a twin screw extruder at a barrel temperature of 100° C. and are extruded at a die temperature of 100° C. The extruded strand is cooled and pelletized. The obtained granulate-chips are ground in a mill (Feinprallmühle 100 UPZ-II, Fa. HOSOKAWA ALPINE) followed by sieving using a 100 μm-screen resulting in particle sizes of from 30 to 40 μm.

Such powder coating compositions can be directly applied on a appropriate pre-treated metal surface (single-layer top coating) or on a metal surface provided with a primer coating (double-layer coating). In the case of a double-layer coating, the primer coating could be water-borne or based on a powder coating.

2. Production of a Double-Layer Coating

A water-borne, basic coating pigmented with aluminium flakes is applied to a commonly available chromate pretreated aluminium plate in such a way that a dry film thickness of from 12 to 15 μm results. The applied basic coating is dried at room temperature for 10 minutes and at 80° C. for further 10 minutes. The powder coating composition according to Example 1 is applied by electrostatic spraying on the primed aluminium plate, resulting in a powder coating having a film thickness of from 50 to 60 μm. Afterwards, both the basic coating and the clear powder coating are stoved at 145° C. for 20 minutes.

3. Yellowing of a Double-Layer Coating

Instead of a basic coating which was pigmented with aluminium flakes a white pigmented, water-borne basic coating is used for the production of a double-layer coating according to Example 2. The plates are exposed to a UVCON apparatus (UV fluorescent light 313 nm for 8 hours at 70° C. and 4 hours at 50° C.) to test for accelerated weathering.

4. Comparison Example

A double-layer coated aluminium plate is produced according to the process described in Examples 1 to 3 except that TINUVIN 900®is used instead of compound Ia. The yellow discoloration of this powder coating comprising an UV-absorber according to the prior art is considerably more intense than the one of Example 3 comprising an UV-absorber according to the invention.

Similar results are obtained if the other compounds according to formula I are used instead of compound Ia.

5. Preparation of Compound Ia

A) Azo Dyestuff 27.2 g of NaOH are dissolved in 300 ml of methanol in a 1 liter beaker, 26.9 g of the phenol of the formula

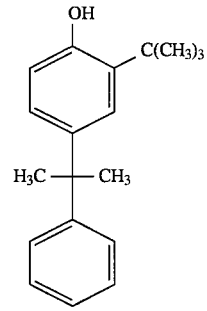

are added. The colorless solution becomes yellow. The solution is then cooled to 5° C. to 0° C.

A cold o-nitrobenze diazonium chloride solution is prepared from 16.6 g of o-nitroaniline and 8.6 g of sodium nitrite in a mixture of 31 ml of conc. HCl and 15 ml of water at −5° C. to 0° C. This solution is added dropwise into the reaction mixture and the resulting deep red-black solution is warmed to 10° C. overnight in a Dewar flask. The solution is then acidified with 50 ml of conc. HCl whereby a fine "tile-red" precipitate results. After stirring for one hour at room temperature, the mixture is filtered over a D3 glass filter vacuum filter, the precipitate is washed twice each time with 100 ml methanol and three times with 250 ml of water. Drying is carried out in a vacuum cupboard at 80° C. The yield is 80–90% of theory. The melting point is 102°–104° C. The resulting product is of the formula

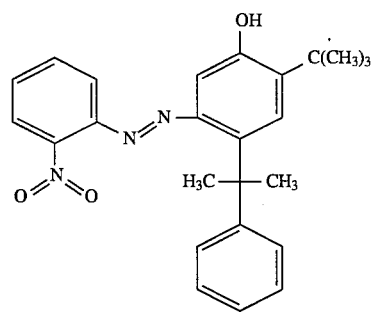

B) Benzotriazole

In a 1 liter sulphonating vessel with stirrer, reflux condenser, pipetting apparatus and internal thermometer, 62.5 pans of the diazo dye product (of pan A) in 550 ml of diethylene glycol dimethylether is warmed to 100° C. 14 g of KOH powder are added and the reaction mixture turns violet. 12.5 g of hydrazide hydrate is added dropwise over 1 hour. Finally after stirring for 2 hours at this temperature the mixture is cooled to room temperature. With the addition of 250 ml of water and bringing the pH to about 6 with concentrated HCl, benzotriazole result. The product is allowed to crystallize out overnight from methanol/isopropanol mixture. The yield is 70–80% of theory, the melting point is 113°–114° C. and is a light beige colour.

The resulting product is of the formula Ia

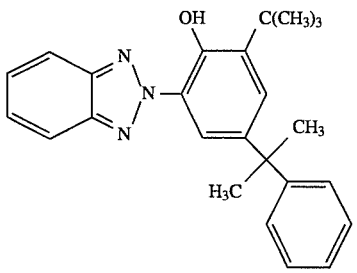

We claim:
1. A powder coating composition comprising
A) a binder system
B) specific powder coating additives
C) at least one compound of formula I

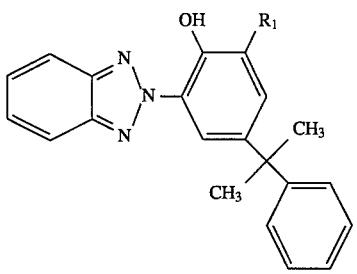

in which $R_1$ is methyl, ethyl, n-propyl, iso-propyl, n-butyl, sec-butyl or tert-butyl and optionally D) additional compounds selected from the group consisting of antioxidants, UV-stabilizers, UV-absorbers, acid scavengers, radical scavengers, pigments, dyes, UV-quenchers, processing stabilizers, fillers, and tribo-charging additives.

2. A composition according to claim 1 characterized in that $R_1$ is tert-butyl.

3. A composition according to claim 1
characterized in that component (C) is present in an amount of 0.01 to 5% by weight based on component (A).

4. A composition according to claim 1
characterized in that component (C) is present in an amount of 0.02 to 2% by weight based on component (A).

5. A composition according to claim 1 characterized in that component (D) is a processing stabilizer and is present in an amount of from 0.01 to 8% by weight based on component (A).

6. A composition according to claim 5 characterized in that the processing stabilizer is present in an amount of from 0.02 to 5% by weight based on component (A).

7. A composition according to claim 5
characterized in that the processing stabilizer is a phosphite or phosphonite.

8. A process for stabilising powder coatings characterized in that a compound of formula I according to claim 1 is added in an amount of from 0.01 to 5% by weight based on the binder system to the powder coatings.

9. A process according to claim 8 characterized in that compound I of formula I according to claim 1 is added in an amount of from 0.02 to 2% by weight based on the binder system.

10. A composition according to claim 2
characterized in that component (C) is present in an amount of 0.01 to 5% based on component (A).

11. A composition according to claim 2 characterized in that component (C) is present in an amount of 0.02 to 2% by weight based on component (A).

12. A composition according to claim 6 characterized in that the processing stabilizer is a phosphite or phosphonite.

13. A coated metal subtrate having as a coating layer comprising a composition according to claim 1.

14. A coated metal substrate having
a first coating layer in contact with said metal substrate, and,
a second coating layer in contact with said first coating layer comprising a composition according to claim 1.

15. A coated metal substrate according to claim 14 wherein the first coating layer comprises a pigment.

16. A coated metal substrate according to claim 15 wherein the first coating layer comprises metallic particles.

17. A coated metal substrate according to claim 16 wherein the first coating layer comprises aluminum flakes.

18. A coated metal substrate according to claim 14 wherein the first coating layer is a primer coating.

19. A coated metal substrate according to claim 18 wherein the primer coating layer comprises a pigment.

20. A method of absorbing UV radiation in a powder coating which comprises incorporating into said powder coating an effective amount of a compound of Formula I according to claim 1.

21. A composition of claim 1 wherein the compound of Formula I is not micronised before incorporation into said composition.

* * * * *